US009632402B2

(12) United States Patent
Matsumiya et al.

(10) Patent No.: US 9,632,402 B2
(45) Date of Patent: *Apr. 25, 2017

(54) LIGHT SOURCE APPARATUS INCLUDING ROTATABLE HANDLE AND ELECTRICAL CONNECTOR AND PROJECTOR INCLUDING LIGHT SOURCE APPARATUS

(71) Applicant: Seiko Epson Corporation, Tokyo (JP)

(72) Inventors: Toshio Matsumiya, Matsumoto (JP); Hiroshi Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 14/085,552

(22) Filed: Nov. 20, 2013

(65) Prior Publication Data

US 2014/0078477 A1 Mar. 20, 2014

Related U.S. Application Data

(63) Continuation of application No. 12/369,873, filed on Feb. 12, 2009, now Pat. No. 8,613,518.

(30) Foreign Application Priority Data

Mar. 5, 2008 (JP) .................................. 2008-054504

(51) Int. Cl.
*G03B 21/20* (2006.01)
*F21V 15/01* (2006.01)
*G03B 21/14* (2006.01)

(52) U.S. Cl.
CPC .............. *G03B 21/20* (2013.01); *F21V 15/01* (2013.01); *F21V 15/012* (2013.01);
(Continued)

(58) Field of Classification Search
CPC .. G03B 21/20; G03B 21/2093; G03B 21/145; F21V 17/164; F21V 17/20; F21V 15/015;
(Continued)

(56) References Cited

U.S. PATENT DOCUMENTS 3,502,864 A * 3/1970 Wagner .............. G03B 21/2046
362/306
3,761,170 A * 9/1973 Genesky ............ G03B 21/2046
353/100
(Continued)

FOREIGN PATENT DOCUMENTS

CN 1677220 A 10/2005
CN 2788007 Y 6/2006
(Continued)

OTHER PUBLICATIONS

Iec 60320-1 ed2.1 Consol. with aml: Nov. 27, 2007.
(Continued)

*Primary Examiner* — Bao-Luan Le
(74) *Attorney, Agent, or Firm* — ALG Intellectual Property, LLC

(57) ABSTRACT

The disclosure includes a light source apparatus that emits a light. In one example, the light source apparatus includes a connector that electrically connects the light source apparatus to a light source driver in a projector and a light source apparatus housing that houses the light source apparatus. The light source apparatus housing includes a rotatable handle having two positions, a standing position used to grasp and remove the light source apparatus in a pulling-out direction, and a housed position used to house the rotatable handle. The handle includes two shaft portions that are inserted into the light source apparatus housing. The tips of
(Continued)

the shaft portions face each other. The positions of the medial axes of the shaft portions are mutually offset from each other.

10 Claims, 6 Drawing Sheets

(52) U.S. Cl.
CPC .......... *F21V 15/013* (2013.01); *G03B 21/145* (2013.01); *G03B 21/2046* (2013.01); *G03B 21/2093* (2013.01)

(58) Field of Classification Search
CPC ................. F21V 15/013; F21V 15/012; A47J 2037/0777
See application file for complete search history.

(56) References Cited

U.S. PATENT DOCUMENTS

| | | | | |
|---|---|---|---|---|
| 3,789,212 A | * | 1/1974 | Wagner | G03B 21/2046 362/306 |
| 4,385,345 A | * | 5/1983 | Freudenreich | B60Q 1/0064 362/306 |
| 4,390,935 A | * | 6/1983 | Audesse | G03B 21/20 362/294 |
| 6,032,334 A | * | 3/2000 | Iima et al. | 16/405 |
| 6,527,392 B1 | * | 3/2003 | Takizawa et al. | 353/34 |
| 6,863,418 B2 | * | 3/2005 | Masuoka et al. | 362/264 |
| 7,241,029 B2 | * | 7/2007 | Tsai | 362/277 |
| 7,261,459 B2 | | 8/2007 | Saegusa | |
| D558,252 S | | 12/2007 | Matsumiya et al. | |
| D574,408 S | | 8/2008 | Kobayashi et al. | |
| 7,572,032 B2 | * | 8/2009 | Lu | G03B 21/145 362/285 |
| 8,894,221 B2 | * | 11/2014 | Okoshi | 353/119 |
| 2004/0263790 A1 | | 12/2004 | VanOverloop et al. | |
| 2005/0099803 A1 | | 5/2005 | Krieger | |
| 2006/0232982 A1 | * | 10/2006 | Tsai | 362/371 |
| 2007/0109786 A1 | * | 5/2007 | Lu | G03B 21/145 362/285 |
| 2008/0079906 A1 | | 4/2008 | Finn | |
| 2008/0170395 A1 | * | 7/2008 | Ho | G03B 21/145 362/240 |

FOREIGN PATENT DOCUMENTS

| | | |
|---|---|---|
| JP | 11-119665 A | 4/1999 |
| JP | 2004-294683 A | 10/2004 |
| JP | 2005-284120 A | 10/2005 |
| JP | 2008-176199 A | 7/2008 |

OTHER PUBLICATIONS

Non-Final Office Action received in U.S. Appl. No. 12/369,873; May 13, 2011.
Final Office Action received in U.S. Appl. No. 12/369,873; Oct. 24, 2011.
Notice of Allowance and Notice of Allowability received in U.S. Appl. No. 12/369,873; Aug. 20, 2013.

* cited by examiner

LIGHT SOURCE APPARATUS INCLUDING ROTATABLE HANDLE AND ELECTRICAL CONNECTOR AND PROJECTOR INCLUDING LIGHT SOURCE APPARATUS

CROSS-REFERENCE

The present application is a continuation application of U.S. patent application Ser. No. 12/369,873 filed on Feb. 12, 2009, which claims priority from Japanese Patent Application No. 2008-054504 filed on Mar. 5, 2008, which are hereby incorporated by reference in their entirety.

BACKGROUND

1. Technical Field

The present invention relates to a light source apparatus and a projector.

2. Related Art

There has been a light source apparatus including a light source apparatus body having a light source lamp and a reflector aligning light fluxes emitted from the light source lamp in a fixed light-exiting direction and a light source apparatus housing that houses the light source apparatus body, and a projector using such a light source apparatus (see JP-A-2005-284120, for example).

The light source apparatus described in JP-A-2005-284120 further includes a connector for electrically connecting the light source apparatus to a light source driver. The connector is connected to a connector provided in an enclosure of the projector when the light source apparatus is attached to the enclosure of the projector.

The light source apparatus housing includes protrusions to be grasped when the light source apparatus is removed from the projector. A user of the projector grasps the protrusions and removes the light source apparatus from the enclosure of the projector.

The light source apparatus described in JP-A-2005-284120, however, has a problem resulting from the fact that the position of the connector is spaced apart from the position of the protrusions. That is, when the user of the projector grasps the protrusions to remove the light source apparatus, the force applied to the light source apparatus is not sufficiently transferred to the connector. The connector is therefore difficult to be pulled out and hence the light source apparatus is difficult to be removed from the projector.

SUMMARY

An advantage of some aspects of the invention is to provide an easily removable light source apparatus that allows the force applied by a user to be sufficiently transferred to a connector, and a projector.

A light source apparatus according to an aspect of the invention includes alight source apparatus body that emits light, the light source apparatus body includes a connector that electrically connects the light source apparatus body to a light source driver and a light source apparatus housing that houses the light source apparatus body, the light source apparatus housing includes a handle used to grasp the light source apparatus and a connector holder that holds the connector. The handle is connected to the connector holder.

According to such a configuration, since the handle that is grasped when the light source apparatus is removed is connected to the connector holder that holds the connector, the force applied by the user can be sufficiently transferred to the connector, whereby the connector can be readily pulled out. Accordingly, the light source apparatus can be readily removed.

In the above aspect of the invention, the connector preferably includes a protrusion protruding in a direction that intersects the direction along which the connector is pulled out. The connector holder preferably includes a supporting portion that supports the protrusion. The supporting portion preferably includes a recess in which the protrusion moves along the pulling-out direction and fits, and a through hole that passes through to the recess. The handle preferably includes a shaft portion to be inserted into the through hole. The protrusion is preferably locked with the shaft portion, and at least part of the protrusion is preferably located, relative to the shaft portion, toward the pulling-out direction.

According to such a configuration, when a user grasps the handle and applies a force in the direction along which the connector is pulled out, the force applied by the user acts on the shaft portion of the handle also in the direction along which the connector is pulled out. Since at least part of the protrusion of the connector is located, relative to the shaft portion, toward the direction along which the connector is pulled out, the force applied to the shaft portion acts on the protrusion also in the direction along which the connector is pulled out and hence serves to pull out the connector. Therefore, the force applied by the user can be directly transferred to the connector, whereby the light source apparatus can be more readily removed.

To locate at least part of the protrusion, relative to the shaft portion, toward the direction along which the connector is pulled out, for example, a recess that is concave toward the direction along which the connector is pulled out is provided in the supporting portion, and the shaft portion is disposed on the opposite side of the protrusion to the direction along which the connector is pulled out. This configuration allows the protrusion to be sandwiched between the recess and the shaft portion.

Alternatively, for example, a hole may be formed in the protrusion in the position that corresponds to the through hole formed in the supporting portion, and the shaft portion is inserted into the through hole and the hole formed in the protrusion.

In the above aspect of the invention, the handle preferably has a shape extending along the light source apparatus housing and has shaft portions on opposite sides of the light source apparatus housing, the shaft portions being parallel to each other but having different central axes, and each of the shaft portions is preferably rotatably supported by the light source apparatus housing.

According to such a configuration, since the shaft portions are parallel to each other but have different central axes, the handle is twisted when the handle is rotated by applying a load such that each shaft portion is rotated. The handle will return to the original position when the applied load is removed.

Therefore, for example, when the handle is configured to stand toward the direction along which the connector is pulled out, applying a load to rotate and incline the handle allows the size of the overall light source apparatus to be reduced. Further, since the handle returns to the original position, that is, the standing position oriented in the pulling-out direction, when the applied load is removed, the user readily grasps the handle when the user uses it.

A projector according to another aspect of the invention includes the light source apparatus described above, a optical modulator that modulates light outputted from the light source apparatus in accordance with input image information to form image light, and a projection optical apparatus that enlarges and projects the image light formed by the optical modulator.

In the above aspect of the invention, since the projector includes the light source apparatus described above, the same advantageous effect as that of the light source apparatus described above is provided.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will be described below with reference to the drawings.
Schematic Configuration of Projector FIG. 1 is a diagram showing a schematic configuration of a projector 1.

The projector 1 modulates light emitted from a light source in accordance with image information to form a color image (image light) and enlarges and projects the color image on a screen or any other projection surface (not shown). The projector 1 includes a substantially box-shaped outer enclosure 2, a projection lens 3, and an optical unit 4, as shown in FIG. 1.

The projection lens 3 as a projection optical apparatus is comprised of a combined lens including a set of lenses, and enlarges and projects a color image formed by the optical unit 4, which will be described later, on a screen or any other projection surface.

Figure 1:
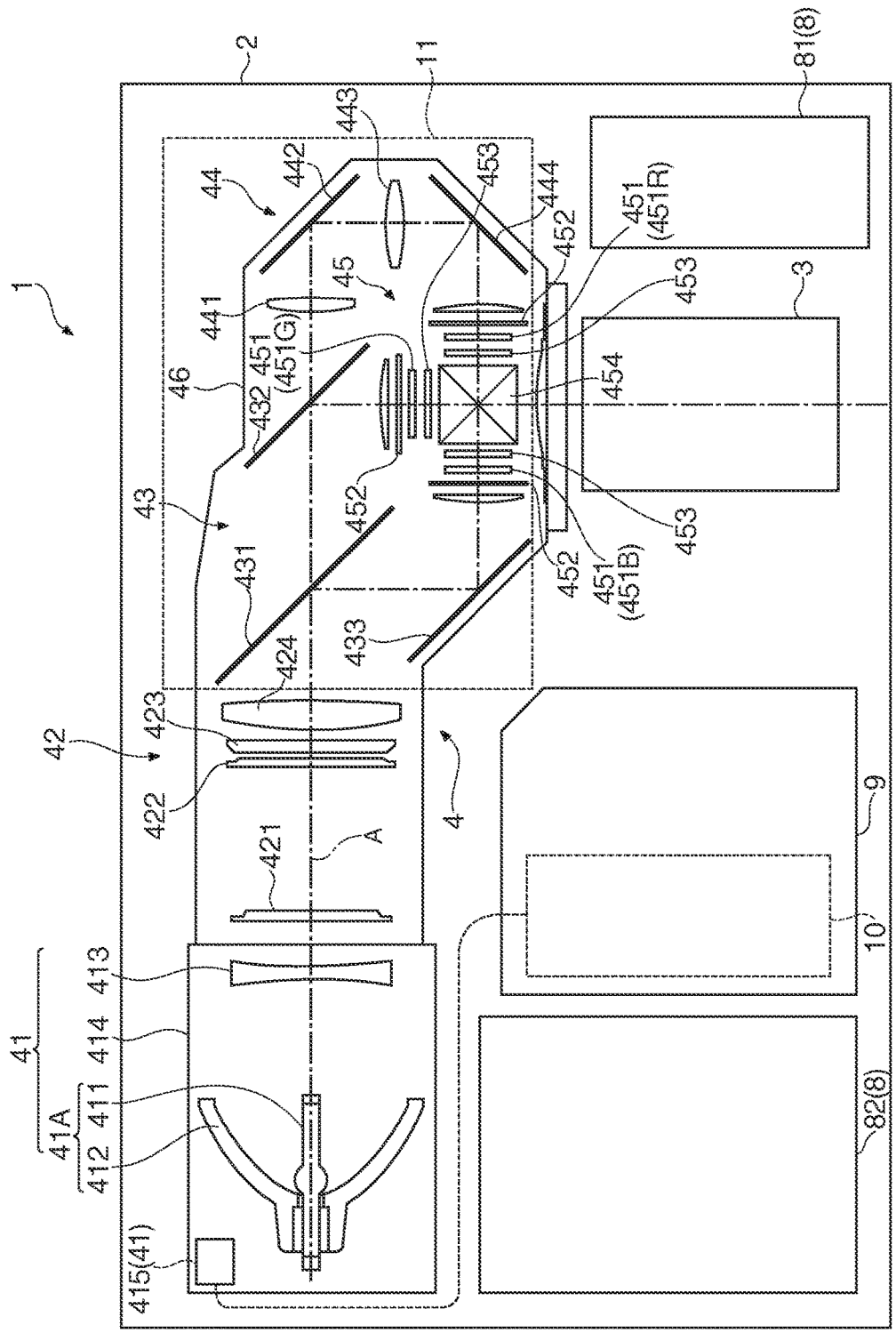
FIG. 1 is a diagram showing a schematic configuration of a projector.

In FIG. 1, the space in the outer enclosure 2 other than the space for the projection lens 3 and the optical unit 4 houses, for example, a cooling unit 8 including an intake apparatus 81 that sucks air into the projector 1, an exhaust apparatus 82 that exhausts the air in the projector 1, and a cooling fan that cools the components in the projector 1, a power supply unit 9 that supplies electric power to the components in the projector 1, a ballast unit 10 (light source driver) that drives a light source 41, which will be described later, and a control unit 11 that controls the components in the projector 1.

The optical unit 4 forms a color image in accordance with image information by optically processing light emitted from a light source under the control of the control unit described above. The optical unit 4 includes a light source apparatus 41, an illumination optical apparatus 42, a color separation optical apparatus 43, a relay optical apparatus 44, an optical apparatus 45, and an optical part enclosure 46 that disposes the optical parts 41 to 45 in predetermined positions with respect to an illumination optical axis A set in the optical part enclosure 46.

The light source apparatus 41 includes alight source apparatus body 41A having a light source lamp 411 that emits light fluxes and a reflector 412 that aligns the light fluxes emitted from the light source lamp 411 in a fixed light-exiting direction, and a parallelizing concave lens 413 that parallelizes the light fluxes, the light-exiting directions of which are aligned by the reflector 412. The light fluxes parallelized by the parallelizing concave lens 413 exit toward the illumination optical apparatus 42.

The light source apparatus 41 further includes a lamp housing 414 that is connected to the optical part enclosure 46 and houses the members 411 to 413. The members 411 to 413, when housed and disposed in the lamp housing 414, are located in predetermined positions with respect to the optical part enclosure 46 (the predetermined positions allow the optical axis of the light outputted from the light source apparatus 41 to coincide with the illumination optical axis A set in the optical part enclosure 46). The light source apparatus 41 will be described later in detail.

The illumination optical apparatus 42 includes a first lens array 421, a second lens array 422, a polarization conversion element 423, and a superimposing lens 424. The first lens array 421 divides the light outputted from the light source apparatus 41 into a plurality of segmented light fluxes and focuses the divided light fluxes in the vicinity of the second lens array 422. Each of the segmented light fluxes outputted from the second lens array 422 is incident on the polarization conversion element 423 in such a way that the central axis (principal ray) of the segmented light flux is oriented perpendicular to the plane of incidence of the polarization conversion element 423, where the segmented light flux is converted into substantially one type of linearly polarized light flux and outputted. The plurality of segmented light fluxes that have exited from the polarization conversion element 423 as linearly polarized light fluxes and passed through the superimposing lens 424 are superimposed on three optical modulators 451, which will be described later, in the optical apparatus 45.

The color separation optical apparatus 43 includes two dichroic mirrors 431, 432 and a reflection mirror 433, and serves to separate the plurality of segmented light fluxes outputted from the illumination optical apparatus 42 into red, green, and blue three color light fluxes.

The relay optical apparatus 44 includes a light incident-side lens 441, a relay lens 443, and reflection mirrors 424, 444, and serves to guide the color light fluxes separated by the color separation optical apparatus 43 to optical modulators 451, which will be described later, in the optical apparatus 45.

The optical apparatus 45 modulates incident light in accordance with image information to form a color image. The optical apparatus 45 includes three optical modulators 451 (optical modulator for red light 451R, optical modulator for green light 451G, and optical modulator for blue light 451B), a light incident-side polarizer 452 disposed upstream of each of the optical modulators 451 in the optical path, a light exiting-side polarizer 453 disposed downstream of each of the optical modulators 451 in the optical path, and a cross dichroic prism 454.

Each of the light incident-side polarizers 452 transmits only light having a polarization direction substantially the same as the polarization direction aligned by the polarization conversion element 423 and absorbs the rest of the light. The light incident-side polarizer 452 is formed by attaching a polarization film on a light-transmissive substrate.

Each of the optical modulators 451 encapsulates and seals a liquid crystal material, which are electro-optic substances, between a pair of transparent glass substrates, and modulates the polarization direction of the light outputted from the corresponding light incident-side polarizer 452 by controlling the orientation of the liquid crystal material using a drive signal from the control unit described above.

Each of the light exiting-side polarizers 453 has substantially the same function as that of the light incident-side polarizer 452, and transmits part of the light modulated by the corresponding optical modulator 451 that is polarized in a fixed direction and absorbs the rest of the light.

The cross dichroic prism 454 combines the color light fluxes outputted from the light exiting-side polarizers 453 to form a color image. The cross dichroic prism 454 is formed by bonding four rectangular prisms and thus has a substantially square shape when viewed from above. Two dielectric multilayer films are formed along the interfaces between these bonded rectangular prisms. The dielectric multilayer films transmit the color light flux that has exited from the optical modulator 451G and passed through the corresponding light exiting-side polarizer 453, whereas reflecting the color light fluxes that have exited from the optical modulators 451R and 451B and passed through the corresponding light exiting-side polarizers 453. The cross dichroic prism 454 thus combines the color light fluxes to form a color image. The color image formed by the cross dichroic prism 454 is enlarged and projected by the projection lens 3 described above.

Detailed Configuration of Light Source Apparatus

Figure 2:
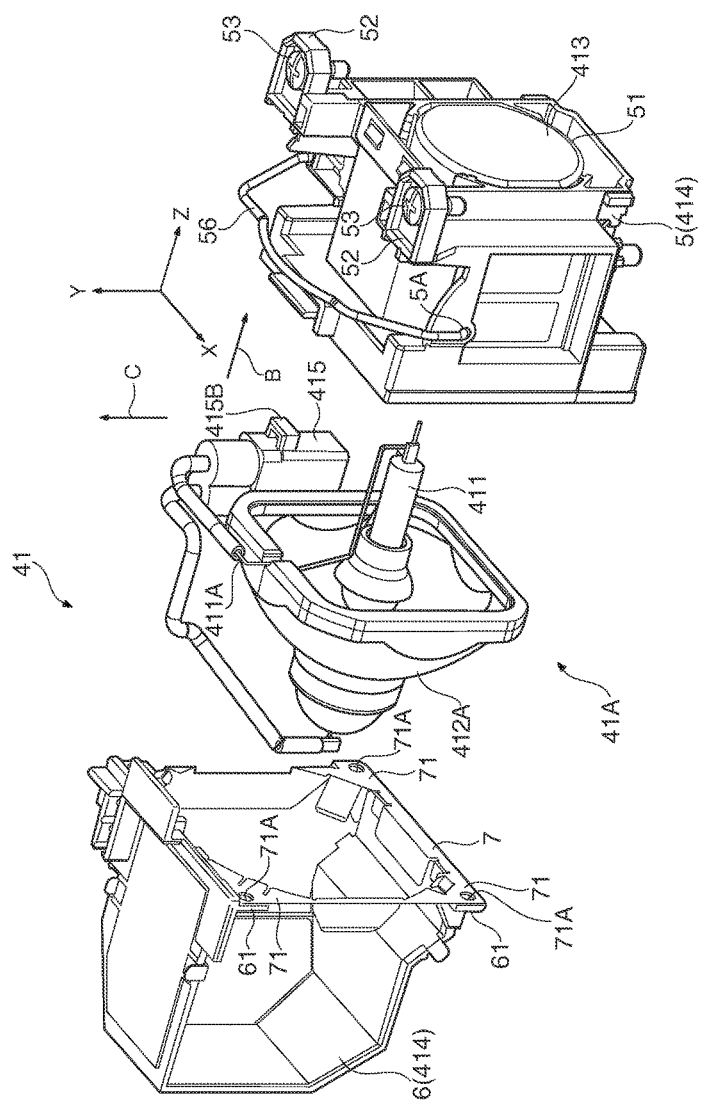
FIG. 2 is an exploded perspective view of a light source apparatus viewed from a diagonally front side.
Figure 3:
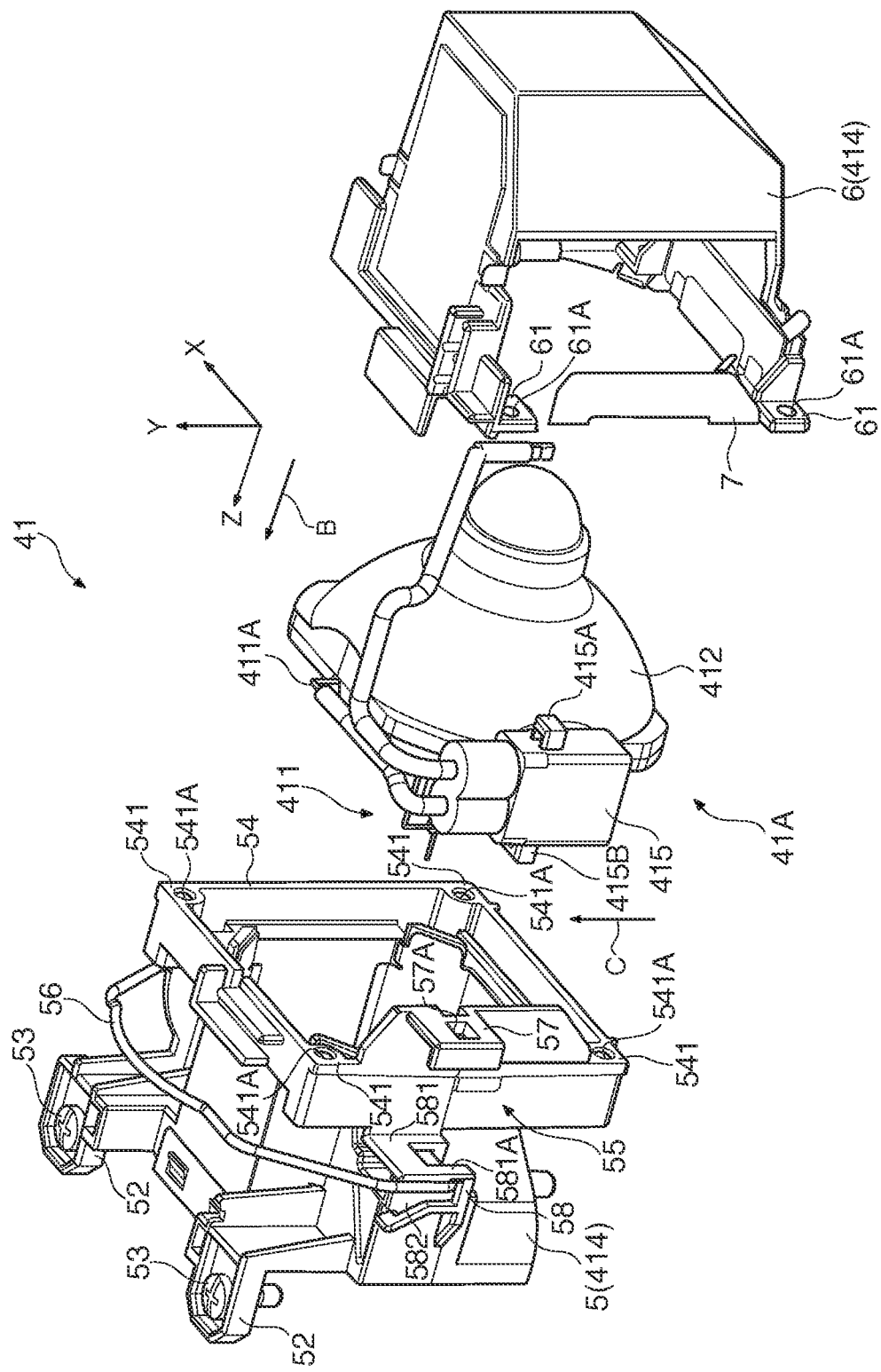
FIG. 3 is an exploded perspective view of the light source apparatus viewed from a diagonally rear side.

FIG. 2 is an exploded perspective view of the light source apparatus 41 viewed from a diagonally front side. FIG. 3 is an exploded perspective view of the light source apparatus 41 viewed from a diagonally rear side. In the following description to be made with reference to FIGS. 2 and 3, the illumination optical axis A (see FIG. 1) is called a Z axis and two axes perpendicular to the Z axis are called X and Y axes. The same thing holds true in the drawings following FIGS. 2 and 3.

The light source apparatus body 41A includes not only the light source lamp 411 and the reflector 412 described above but also a substantially box-shaped connector 415 connected to respective lead wires 411A in the light source lamp 411, as shown in FIGS. 2 and 3.

The connector 415 is intended to electrically connect the ballast unit 10 to the light source apparatus 41. Specifically, the light source apparatus 41 is attached to the optical part enclosure 46 (see FIG. 1) so that the light source apparatus 41 is connected to a connector (not shown) provided in the optical part enclosure 46, and the connection allows electric power to be supplied from the ballast unit 10 to the light source lamp 411.

The lamp housing 414 as a light source apparatus housing includes a first housing 5 disposed on the side in a light-exiting direction B along which the light from the light source apparatus body 41A exits (on the +Z-axis side), a second housing 6 disposed on the side in the direction opposite to the light-exiting direction B (on the −Z-axis side), and an urging member 7 interposed between the first housing 5 and the second hosing 6, as shown in FIGS. 2 and 3.

The first housing 5 is a member that is shaped into a substantially rectangular tube and covers the front side (+Z-axis side) of the light source apparatus body 41A. A substantially circular opening 51 is formed in the front surface (the surface on the +Z-axis side) of the first housing 5 as shown in FIG. 2, and the parallelizing concave lens 413 fits in the opening 51 and is fixed therein.

Two extending portions 52 are formed on the front side of the upper surface (the surface on the +Y-axis side) of the first housing 5 on both ends thereof in the X-axis direction. Each of the two extending portions 52 first extends upward (in the +Y-axis direction) and then extends forward. An inserting hole (not shown) is formed in a substantially central portion of the upper surface of each of the extending portions 52, and the light source apparatus body 41A is fixed to the optical part enclosure 46 by driving screws 53 inserted into the inserting holes into threaded holes (not shown) provided in the optical part enclosure 46.

Further, a substantially rectangular frame-like opening 54 is formed in the rear end (the end on the −Z-axis side) of the first housing 5, as shown in FIG. 3. First fixing portions 541 to be fixed to the second housing 6 are formed at the four corners of the opening 54. A threaded hole 541A is formed along the Z-axis direction in each of the first fixing portions 541.

The second housing 6 is a member that has a substantially U-shaped cross section and covers the upper side, the lower side (the −Y-axis side), and the rear side of the light source apparatus body 41A. Second fixing portions 61 to be fixed to the first housing 5 are provided in the front end of the second housing 6 in the positions that correspond to the first fixing portions 541. Holes 61A are formed in the second fixing portions 61 in the positions that correspond to the threaded holes 541A.

The urging member 7 is a member that is shaped into a substantially rectangular frame and urges the light source apparatus body 41A toward the first housing 5. Sandwiched portions 71 to be sandwiched between the first fixing portions 541 and the second fixing portions 61 are provided at the four corners of the urging member 7. Holes 71A are formed in the sandwiched portions 71 in the positions that correspond to the threaded holes 541A and the holes 61A.

The first housing 5, the second housing 6, and the urging member 7 are integrated by driving four screws 417 (see FIG. 4) into the threaded holes 541A through the holes 61A and the holes 71A.

Connector Holding Structure

Figure 4:
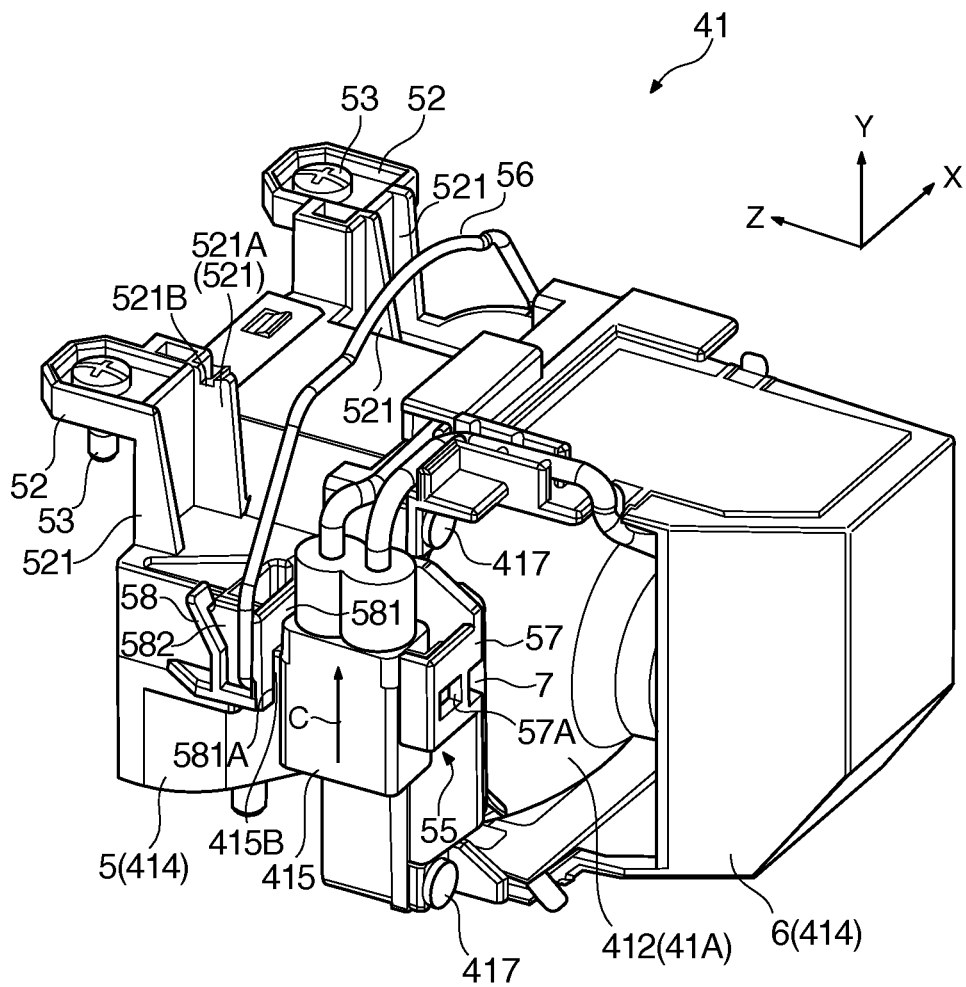
FIG. 4 shows a first housing, a second housing, and an urging member integrated with one another and viewed from a diagonally rear side.
Figure 5:
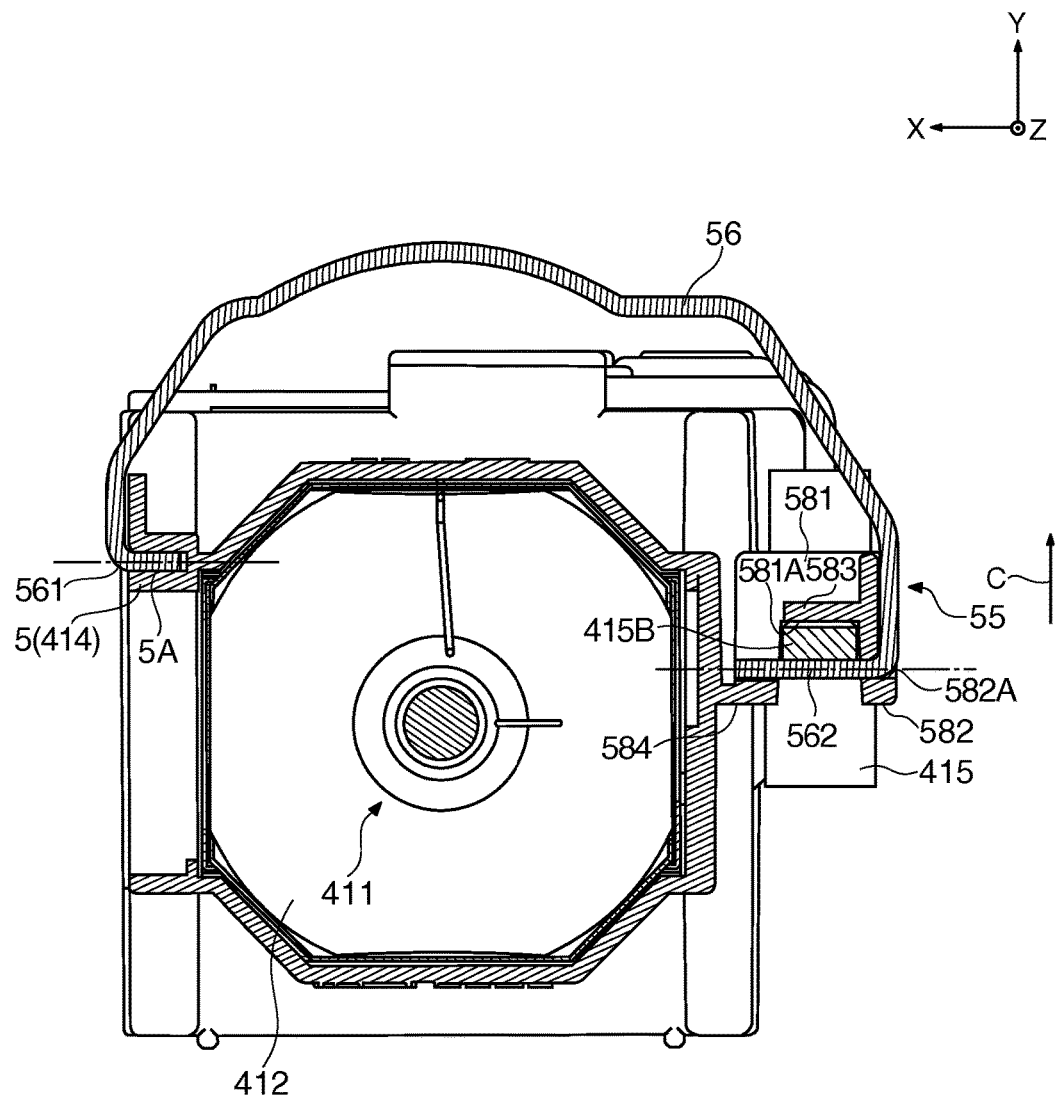
FIG. 5 is a cross-sectional view of the light source apparatus taken along an XY plane.

FIG. 4 shows the integrated first housing 5, second housing 6, and urging member 7 viewed from a diagonally rear side. FIG. 5 is a cross-sectional view of the light source apparatus 41 taken along an XY plane.

The connector 415 has two substantially box-shaped protrusions 415A and 415B that protrude from both ends of the connector 415 along the Z-axis direction, as shown in FIG. 3. That is, the protrusions 415A and 415B protrude in a direction that intersects a direction C along which the connector 415 is pulled out (+Y-axis direction).

The first housing 5 includes not only the components 51 to 54 described above but also a connector holder 55 that holds the connector 415 and a handle 56 used to grasp the light source apparatus 41, as shown in FIG. 4.

The connector holder 55 is provided on a −X-axis-side surface of the first housing 5, and includes a first supporting portion 57 that first extends rearward from the rear end of the opening 54 and then extends in the −X-axis direction, and a second supporting portion 58 that extends from the front end of the opening 54 in the −X-axis direction, as shown in FIG. 3.

The first supporting portion 57 supports the −Z-axis-side protrusion 415A of the connector 415, and a hole 57A along the Z-axis direction having a substantially rectangular cross-sectional shape is formed in the surface of the first supporting portion 57 that faces the connector 415. The protrusion 415A is inserted into the hole 57A and supported therein.

The second supporting portion 58 supports the +Z-axis-side protrusion 415B of the connector 415, and includes a facing portion 581 that faces the connector 415, a connecting portion 582 that is substantially perpendicular to the facing portion 581 and to which the handle 56 is connected, a restricting portion 583 that intersects the facing portion 581 and the connecting portion 582 and is located above the protrusion 415B, and an extending portion 584 that is located on the opposite side of the protrusion 415B to the connecting portion 582 and extends in the −X-axis direction, as shown in FIGS. 4 and 5.

An upwardly concave recess 581A is formed in the facing portion 581, and the protrusion 415B enters the recess 581A from below along the pulling-out direction C and fits therein.

A through hole 582A that passes through to the recess 581A is formed in the connecting portion 582. That is, the second supporting portion 58 corresponds to the supporting portion in an embodiment of the invention.

The restricting portion 583 is integrated with the facing portion 581 and the connecting portion 582 and restricts the movement of the protrusion 415B in the pulling-out direction C.

The extending portion 584 is provided along the lower edge of the through hole 582A and supports, along with the through hole 582A, the handle 56 from below.

The handle 56 has a curved shape extending along the lamp housing 414 and has substantially cylindrical shaft portions 561 and 562 on opposite sides of the lamp housing 414, the shaft portions 561 and 562 parallel to each other but having different central axes, as shown in FIGS. 4 and 5. Specifically, the shaft portions 561 and 562 have central axes provided along the X axis, located in the same position in the Z-axis direction, and located in different positions in the Y-axis direction.

The shaft portion 561 is apart from the shaft portion 562 toward the pulling-out direction C, inserted into a hole 5A formed in a +X-axis-side surface of the first housing 5, and rotatably supported, as shown in FIGS. 2 and 5.

The shaft portion 562 is inserted into the through hole 582A in the second supporting portion 58, and rotatably supported by the through hole 582A and the extending portion 584, as shown in FIG. 5. That is, the handle 56 is connected to the connector holder 55. When the shaft portion 562 is inserted into the through hole 582A, the protrusion 415B that has fitted in the recess 581A is caught by the recess 581A, the restricting portion 583, and the shaft portion 562. That is, the shaft portion 562 inserted into the through hole 582A locks the protrusion 415B, and at least part of the protrusion 415B is located, relative to the shaft portion 562, toward the direction C along which the connector 415 is pulled out.

Figure 6:
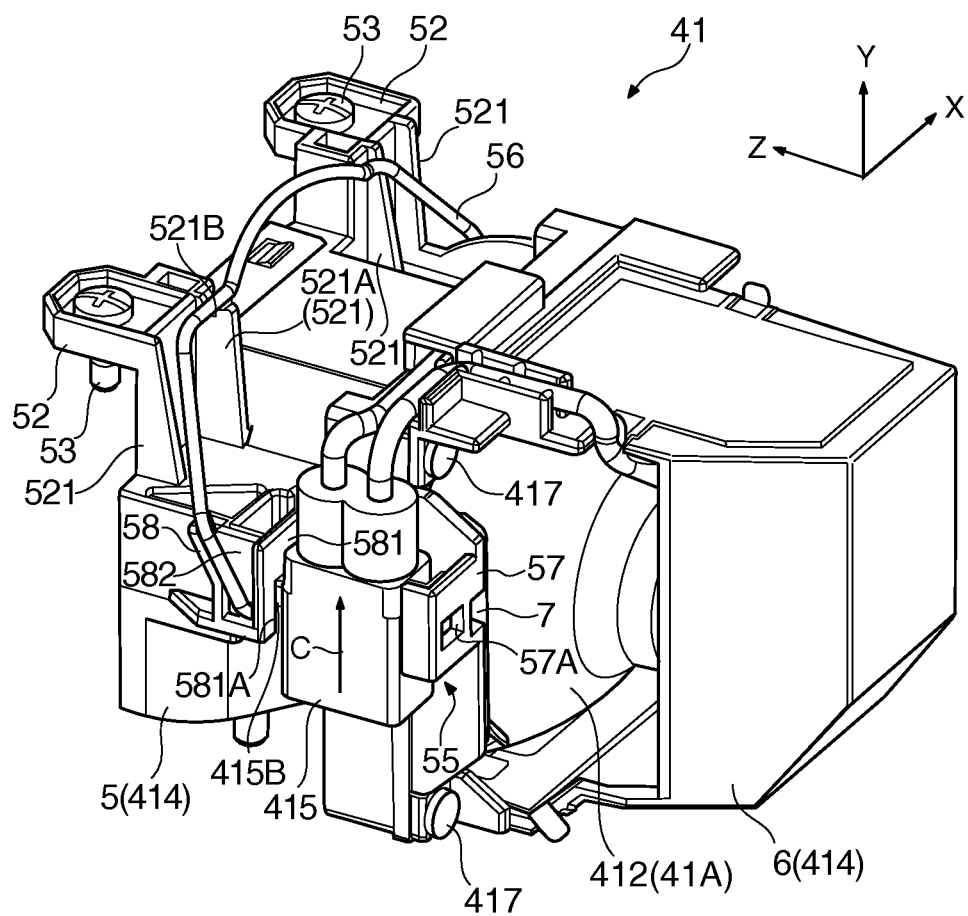
FIG. 6 shows a handle housed in a lamp housing.

FIG. 6 shows the handle 56 housed in the lamp housing 414.

In the first housing 5, two reinforcing surfaces 521 are formed on the rear surface (−Z-axis-side surface) of each of the extending portion 52, the reinforcing surfaces 521 extending rearward to reinforce the extending portion 52, as shown in FIG. 6. For the reinforcing surfaces 521 extending from the −X-axis-side extending portion 52, the +X-axis-side reinforcing surface 521A differs from the other reinforcing surface 521 in that the +X-axis-side reinforcing surface 521A has a substantially rectangular shape and a cutout 521B is formed in the upper end of the +X-axis-side reinforcing surface 521A.

To house the handle 56 in the lamp housing 414, a user of the projector 1 grasps the handle 56 standing in the pulling-out direction C (see FIG. 4) and moves the handle 56 along the +Z-axis direction so that the handle 56 is rotated and inclined. The user further moves the handle 56 in such away that the handle 56 fits in the cutout 521B of the reinforcing surface 521A and is housed in the lamp housing 414. In this process, since the shaft portions 561 and 562 of the handle 56 have central axes that are parallel to each other but have different central axes, the handle 56 is twisted.

To use the handle 56, the user of the projector 1 moves the handle 56 housed in the lamp housing 414 (see FIG. 6) in such a way that the handle 56 disengages from the cutout 521B. When the handle 56 disengages from the cutout 521B, the twisted handle 56 returns back to the standing position oriented in the pulling-out direction C.

According to the present embodiment described above, the following advantageous effects are provided:

1. Since the handle 56 that is grasped when the light source apparatus 41 is removed is connected to the connector holder 55 that holds the connector 415, the force applied by the user can be sufficiently transferred to the connector 415, whereby the connector 415 can be readily pulled out. Accordingly, the light source apparatus 41 can be readily removed.

2. Since the shaft portion 562 inserted into the through hole 582A locks the protrusion 415B, and at least part of the protrusion 415B is located, relative to the shaft portion 562, toward the direction C along which the connector 415 is pulled out, the force applied by the user can be directly transferred to the connector 415, whereby the light source apparatus 41 can be more readily removed.

3. Since the shaft portions 561 and 562 have central axes that are parallel to each other but have different central axes, applying a load to the handle 56 to rotate and incline the handle 56 allows the size of the overall light source apparatus 41 to be reduced. Further, since the handle 56 returns back to the standing position oriented in the pulling-out direction C when the applied load is removed, the user can readily grasp the handle 56 when the user uses it.

Variations of Embodiment

The invention is not limited to the embodiment described above but encompasses variations, modifications, and other forms to the extent that the advantage of some aspects of the invention can be achieved.

In the above embodiment, while the handle 56 is connected to the connector holder 55 by inserting the shaft portion 562 into the through hole 582A in the second supporting portion 58, the handle 56 may be connected to the connector holder, for example, by fixing the handle 56 to the connector holder with an adhesive. In essence, any other configuration may be employed as long as the handle is connected to the connector holder.

In the above embodiment, while the recess 581A is formed to be upwardly concave, the recess 581A may be formed, for example, to be downwardly concave. In essence, any other configuration may be employed as long as the protrusion fits in the recess along the direction along which the connector is pulled out.

In the above embodiment, while the protrusion 415B that has fit in the recess 581A is caught by the recess 581A, the restricting portion 583, and the shaft portion 562, for example, a hole may be formed in the protrusion in the position that corresponds to the through hole formed in the supporting portion and the shaft portion is inserted into the through hole and the hole formed in the protrusion. In essence, any other configuration may be employed as long as the shaft portion inserted into the through hole locks the protrusion and at least part of the protrusion is located, relative to the shaft portion, toward the pulling-out direction.

In the above embodiment, while the handle 56 has a curved shape extending along the lamp housing 414, the handle 56 may have other shapes. For example, the handle 56 may be formed into a U shape protruding in the direction along which the connector is pulled out.

In the above embodiment, the shaft portions 561 and 562 of the handle 56 have central axes that are provided along the X axis, located in the same position in the Z-axis direction, and located in different positions in the Y-axis direction. Alternatively, for example, the shaft portions may have central axes that are provided along the X axis, located in the same position in the Y-axis direction, and located in different positions in the Z-axis direction. In essence, any other configuration may be employed as long as the shaft portions are parallel to each other but have different central axes.

In the above embodiment, while the projector 1 includes the three optical modulators 451, the projector 1 may include an optical apparatus including two optical modulators or an optical apparatus including four or more optical modulators.

In the above embodiment, while each of the optical modulators 451 employs a configuration in which a pair of transparent glass substrates encapsulates and seals a liquid crystal material, which are electro-optic substances, and incident light passes through the optical modulator 451, the configuration of the optical modulator 451 is not limited thereto. For example, a liquid crystal panel configured to reflect incident light, a DMD (Digital Micromirror Device: a trademark of Texas Instruments, USA), or other components may be used.

In the above embodiment, while the projector 1 including the light source apparatus 41 has been described by way of example, the light source apparatus according to an embodiment of the invention may be used in a rear projector or other types of optical apparatus.

The invention can be applied to a light source apparatus, in particular, preferably applied to a light source apparatus used in a projector.

The entire disclosure of Japanese Patent Application No. 2008-054504, filed Mar. 5, 2008 is expressly incorporated by reference herein.

What is claimed is:

1. A light source apparatus that emits a light in a light-exiting direction, comprising:
   a connector that electrically connects the light source apparatus to a light source driver in a projector; and
   a light source apparatus housing that houses the light source apparatus, the light source apparatus housing including:
      a handle used to simultaneously grasp and remove the light source apparatus from the projector by pulling the light source apparatus in a pulling-out direction, the pulling-out direction being substantially perpendicular to the light-exiting direction of the light source apparatus, and
      a connector holder that holds the connector,
   wherein
      the connector includes a protrusion protruding in a direction that intersects the pulling-out direction along which the connector is pulled out and that is parallel to the light-exiting direction,
      at least part of the connector is located, relative to the handle, toward the pulling-out direction along which the connector is pulled out,
      the connector holder includes a facing portion that faces the protrusion, the facing portion including a recess that is located toward the pulling-out direction along which the connector is pulled out and that fits the protrusion,
      the facing portion includes a restricting portion that is located, relative to the protrusion, toward the pulling-out direction along which the connector is pulled out,
      the restricting portion of the facing portion restricts a movement of the protrusion toward the pulling-out direction along which the connector is pulled out,
      the handle includes two shaft portions that are inserted into the light source apparatus housing,
      the two shaft portions extend along a plane that is parallel to the pulling-out direction along which the connector is pulled out,
      the tips of the shaft portions face each other, and
      the positions of the medial axes of the shaft portions are mutually offset from each other in the pulling-out direction along which the connector is pulled out.

2. The light source apparatus according to claim 1, wherein
   the connector holder includes a connecting portion including a through hole,
   a shaft portion of the shaft portions is inserted into the through hole, and
   at least part of the protrusion is located, relative to the shaft portion, toward the pulling-out direction along which the connector is pulled out.

3. The light source apparatus according to claim 2, wherein
   the connecting portion includes the restricting portion that is located, relative to the protrusion, toward the pulling-out direction along which the connector is pulled out.

4. The light source apparatus according to claim 3, wherein
   the restricting portion of the connecting portion restricts a movement of the protrusion toward the pulling-out direction along which the connector is pulled out.

5. The light source apparatus according to claim 2, wherein
   the shaft portion restricts a movement of the protrusion.

6. The light source apparatus according to claim 1, wherein
   the handle has a width that is greater than a width of the light source apparatus housing in a direction parallel to the medial axes of the shaft portions.

7. The light source apparatus according to claim 1, wherein
   the shaft portion that is disposed near the connector is longer than the other shaft portion.

8. The light source apparatus according to claim 1, wherein
   the shaft portion that is disposed near the connector is adjacent to the connector in the light-exiting direction.

9. The light source apparatus according to claim 1, wherein
   the handle includes a curved portion protruding in the pulling-out direction along which the connector is pulled out when the handle is in a standing position.

10. A projector comprising:
   the light source apparatus according to claim 1;
   an optical modulator that modulates light emitted from the light source apparatus in accordance with input image data; and a projection optical apparatus that enlarges and projects the image light modulated by the optical modulator.

* * * * *